United States Patent [19]

Dillman et al.

[11] Patent Number: 5,420,203

[45] Date of Patent: May 30, 1995

[54] PROCESS FOR PRODUCING HIGH DIBLOCK CONTENT BLOCK COPOLYMER COMPOSITIONS

[75] Inventors: Steven H. Dillman, Bellingham, Wash.; David J. St. Clair, Houston, Tex.; Mark A. Berggren, Houston, Tex.; Michael J. Modic, Houston, Tex.

[73] Assignee: Shell Oil Company, Houston, Tex.

[21] Appl. No.: 245,097

[22] Filed: May 17, 1994

[51] Int. Cl.$^6$ .................... C08L 53/02; C08F 297/04
[52] U.S. Cl. ........................... 525/98; 525/314
[58] Field of Search ..................... 525/98, 314

[56] References Cited

U.S. PATENT DOCUMENTS

| | | | |
|---|---|---|---|
| 3,078,254 | 2/1963 | Zelinski et al. | 525/98 |
| 3,135,716 | 6/1964 | Uraneck et al. | 525/122 |
| 3,468,972 | 9/1969 | Hsieh | 525/51 |
| 3,594,452 | 7/1971 | De La Mare et al. | 525/271 |
| 3,595,941 | 7/1971 | Farrar et al. | 525/51 |
| 4,259,220 | 3/1981 | Bunnelle | 525/98 |
| 5,118,762 | 6/1992 | Chin | 525/314 |
| 5,194,500 | 3/1993 | Chin | 525/97 |
| 5,264,489 | 11/1993 | Lanza | 525/101 |

*Primary Examiner*—James J. Seidleck
*Assistant Examiner*—I. Zemel
*Attorney, Agent, or Firm*—Donald F. Haas

[57] ABSTRACT

The present invention is a process for producing high diblock content block copolymer compositions which comprises (a) anionically polymerizing at least one vinyl aromatic hydrocarbon and at least one conjugated diene to form a living block copolymer, (b) coupling the block copolymer with a coupling agent selected from the group consisting of esters of carboxylic acids and asymmetric silanes to create a coupled polymer, (c) combining the coupled polymer with other components to form an enduse composition, and (d) heating the composition at a temperature up to 130° C. for a time sufficient to decouple the coupled copolymer such that the amount of uncoupled copolymer in the composition ranges from 10 to 100% by weight of the total amount of block copolymer.

9 Claims, 1 Drawing Sheet

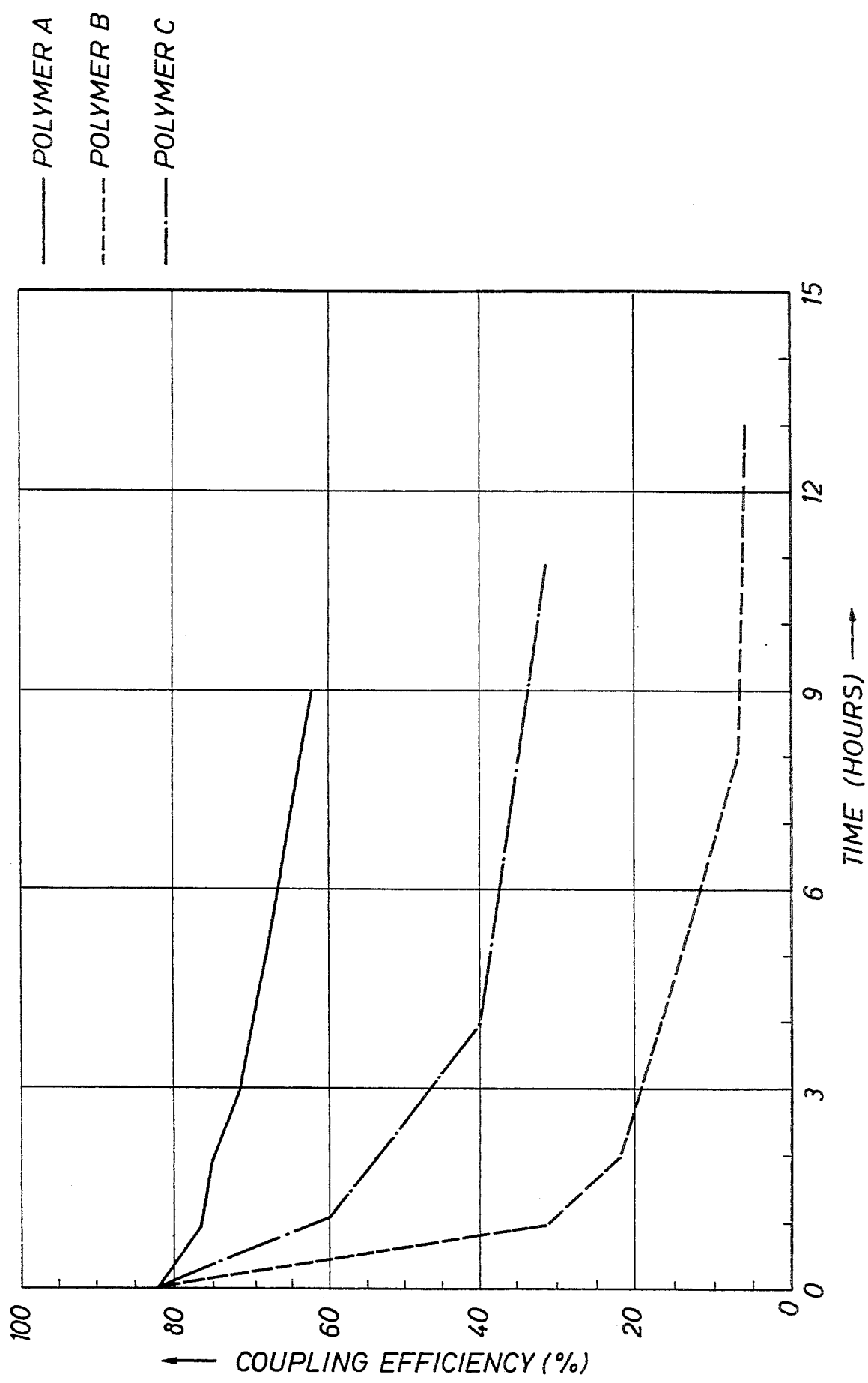

PROCESS FOR PRODUCING HIGH DIBLOCK CONTENT BLOCK COPOLYMER COMPOSITIONS

BACKGROUND OF THE INVENTION

This invention relates to a process for producing compositions which contain block copolymers having low cohesive strength and low elasticity. More particularly, this invention relates to such a process wherein the high strength, highly elastic block copolymers made by coupling low strength block copolymers are decoupled during end use processing, thereby regenerating the low strength block copolymer.

It is known that a block copolymer can be obtained by an anionic copolymerization of a conjugated diene compound and an alkenyl arene compound by using an organic alkali metal initiator. Block copolymers have been produced which comprise primarily those having a general structure

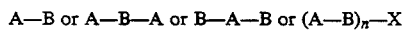

wherein the polymer blocks A comprise thermoplastic polymer blocks of alkenyl arenes such as polystyrene, while block B is a polymer block of a conjugated diene such as polybutadiene or polyisoprene. The proportion of the thermoplastic blocks to the elastomeric polymer block and the relative molecular weights of each of these blocks are balanced to obtain a rubber having unique performance characteristics.

A—B—A triblock polymers and $(A—B)_n—X$ coupled polymers usually are very strong and elastic while A—B diblock polymers or $(B—A)_n—X$ coupled polymers are weak and have little resilience or elasticity. Blends of the triblock $(A—B)_n—X$ polymers and A—B diblock polymers described above are often used in various compositions which require the properties of both. For instance, in adhesives the triblock polymer is required for its strength but it is normally not tacky enough for adhesive uses so a diblock is blended in because diblocks are generally characterized in that they are very tacky. Similarly, blends of this type are used in the impact modification of nylon/polyphenylene ether blends and also in polyolefin blends to reduce viscosity and retain impact strength.

Blends of these strong and weak polymers which have high amounts (e.g., greater than 50%) of weak polymer are very soft and tend to block (undesirable cohesion of the polymer—it tends to fuse into solid blocks under normal storage conditions) severely. In addition, such polymers are difficult to manufacture, ship, and handle in subsequent compounding. The A—B—A triblock and $(A—B)_n—X$ coupled polymers alone do not suffer from these disadvantages. They are hard, resist blocking, are relatively easy to manufacture, ship, and use. Thus, it can be seen that there is a need for a way be able to have the advantages of the weak AB diblocks in end use compositions without having to manufacture and handle them. The present invention provides a way to achieve that goal.

SUMMARY OF THE INVENTION

This invention is a process for producing high diblock content block copolymer end use compositions. The process comprises the steps of:

(a) anionically polymerizing at least one vinyl aromatic hydrocarbon and at least one conjugated diene to form a living block copolymer, (b) coupling the block copolymer with a coupling agent selected from the group consisting of esters of carboxylic acids (e.g., ethyl formate, methyl benzoate, and dimethyl adipate) or asymmetric silanes (e.g., methyltrimethoxysilane and methyltrichlorosilane) to form a coupled block copolymer, (c) combining the coupled copolymer with other components to form an end use composition, and (d) heating the composition to a temperature of at least 130° C. for a time sufficient to decouple the coupled copolymer such that the amount of uncoupled polymer in the composition ranges from 10 to 100% by weight of the total amount of block copolymer.

In a preferred embodiment of this invention, a decoupling accelerator, such as zinc dibutyldithiocarbamate, is added to speed up the decoupling process. If the end use composition is an adhesive, the other components may be tackifying resins, end block resins, oil, etc. If the end use composition is a high impact blend, the other components may be nylon and polyphenylene ether or polyolefins, etc. If the composition is used in road or roofing applications, the other components may be asphalt, both straight-run and oxidized, or some other bituminous material and fillers.

BRIEF DESCRIPTION OF THE DRAWINGS

FIG. 1 shows the coupling efficiency as a function of aging time at 177° C. for hot melt adhesive containing a methyl benzoate coupled SIS polymer.

DETAILED DESCRIPTION OF THE INVENTION

As is well known, polymers containing both aromatic and ethylenic unsaturation can be prepared by copolymerizing one or more polyolefins, particularly a diolefin, such as butadiene or isoprene, with one or more alkenyl aromatic hydrocarbon monomers, such as styrene. The copolymers may, of course, be random, tapered, block or a combination of these, in this case block. The blocks in the copolymers of this invention are made by coupling A—B diblock copolymers. They can be linear, radial, or star molecules depending on the n value in $(A—B)_n—X$. The decoupleable $(A—B)_n—X$ polymers may also be blended with A—B—A polymers or with $(A—B)_n—X'$ polymers made with a non-decoupleable coupling agent.

Polymers containing ethylenic unsaturation or both aromatic and ethylenic unsaturation may be prepared using free-radical, cationic and anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like. Polymers containing ethylenic unsaturation and polymers containing both aromatic and ethylenic unsaturation are, of course, available commercially from several suppliers.

Polymers of conjugated diolefins and copolymers of one or more conjugated diolefins and one or more alkenyl aromatic hydrocarbon monomers are frequently prepared in solution using anionic polymerization techniques. In general, when solution anionic techniques are used, these block copolymers are prepared by contacting the monomers to be polymerized simultaneously or sequentially with an organoalkali metal compound in a suitable solvent at a temperature within the range from about −150° C. to about 300° C., preferably at a temperature within the range from about 0° C. to 100 ° C. Particularly effective anionic polymerization initiators are organolithium compounds having the general formula:

$$RLi_n$$

Wherein:
R is an aliphatic, cycloaliphatic, aromatic or alkyl-substituted aromatic hydrocarbon radical having from 1 to about 20 carbon atoms; and n is an integer of 1 to 4.

The concentration of the initiator can be regulated to control the molecular weight of the overall composition and of the polyvinylaromatic hydrocarbon, generally polystyrene, blocks. Generally, the initiator concentration is in the range of about 0.25 to about 50 millimoles per 100 grams of monomer. The required initiator level frequently depends upon the solubility of the initiator in the hydrocarbon diluent. The ratio of the initiator to the monomer determines the block size, i.e. the higher the ratio of initiator to monomer the smaller the molecular weight of the block.

In general, any of the solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like; linear and cyclic ethers such as methyl ether, methyl ethyl ether, tetrahydrofuran and the like.

As described in U.S. Pat. No. 4,096,203 the disclosure of which is herein incorporated by reference, usually the styrene is contacted with the initiator. Next, the living polymer in solution is contacted with isoprene or another diene. The resulting living polymer has a simplified structure A—B—Li. It is at this point that the living polymer is coupled with a coupling agent which will decouple under end use compounding and mixing conditions.

There are a wide variety of polyfunctional coupling agents which must contain at least two reactive sites and which will couple living A—B—Li diblock polymers. However, most coupling agents result in a stable linkage which will not uncouple during end use processing and therefore are unsuitable for this invention. In the process of the present invention, only a limited number of these coupling agents may be used successfully. Two preferred classes are esters of carboxylic acids (e.g., ethyl formate, methyl benzoate, dimethyl adipate, etc.) and asymmetric silanes (e.g., methyltrimethoxysilane, methyltrichlorosilane, etc.). Methyl benzoate is preferred because it is inexpensive, nontoxic and decouples readily. These coupling agents work very well in coupling the diblock arms to form triblock or (A—B)$_n$—X multiblock copolymers. The polymer is easy to handle and ship and has great advantages over diblocks in terms of its tendency to agglomerate upon storage and shipment. Polymers made with these coupling agents will decouple under conditions of temperature and time normally used during end use compounding. This leaves diblock polymer blended with the remaining triblock or (A—B)$_n$—X polymer. This decoupling is controlled as described below to create blends of diblock with triblock or (A—B)$_n$—X which are useful in adhesives and other applications where such blends are advantageous.

In the prior art, such as that exemplified by U.S. Pat. Nos. 3,595,941 and 3,468,972, the disclosures of which are herein incorporated by reference, the effort was always made to select the particular coupling agent or reaction conditions that resulted in the highest coupling efficiency. High coupling efficiencies are desired herein as well in order to produce more (A—B)$_n$—X polymer. Coupling efficiency is defined as the number of molecules of coupled polymer divided by the number of molecules of coupled polymer plus the number of molecules of uncoupled polymer. Thus, when producing an SIS linear polymer ([SI]$_2$ or S—I—X—I—S), the coupling efficiency is shown by the following relationship:

$$\frac{\text{\# of molecules of (SI)}_2}{\text{\# of molecules of (SI)}_2 \text{ plus SI}}$$

Coupling efficiency can be determined theoretically from the stoichiometric quantity of coupling agent required for complete coupling or coupling efficiency can be determined by an analytical method such as gel permeation chromatography. Typical prior art coupling efficiency is from about 80% to almost 100%. In U.S. Pat. No. 4,096,203, coupling efficiency is controlled from about 20% to about 80%, preferably about 30% to about 70%. In the present invention, it is usually necessary to achieve a coupling efficiency of at least 60% to avoid the problems of having too much diblock.

This coupling efficiency is controlled by a number of methods. One method to reduce coupling efficiency is to add less than the stoichiometric amount of coupling agent required for complete coupling of the polymers. Another means of reducing coupling efficiency is by the premature addition of a terminator compound. These terminators, such as water or alcohol, respond very quickly and could easily be employed to cut short complete coupling of the polymers. In addition, by performing the coupling reaction at elevated temperatures, such as above about 90° C., thermal termination of many of the living polymer groups (A—B—Li) occurs prior to coupling. The typical coupling conditions include a temperature of between about 65° C. and about 75° C. and sufficient pressure to maintain the reactants in a liquid phase.

Following the coupling reaction or when the desired coupling efficiency has been obtained, the product is neutralized such as by the addition of terminators, e.g., hydrogen, water, alcohol or other reagents, for the purpose of terminating residual active anions. The product is then recovered such as by coagulation utilizing hot water or steam or both.

The coupled polymer is then finished and shipped off to the end user. The polymer is then combined with other components to form whatever end use composition is desired.

For instance, in adhesives applications it is usually necessary to add an adhesion promoting or tackifying resin that is compatible with the elastomeric conjugated diene block. A common tackifying resin is a diene-olefin copolymer of piperylene and 2-methyl-2-butene having a softening point of about 95° C. This resin is available commercially under the tradename Wingtack 95 and is prepared by the cationic polymerization of 60% piperylene, 10% isoprene, 5% cyclopentadiene, 15% 2-methyl-2-butene and about 10% timer, as taught in U.S. Pat. No. 3,577,398. Other tackifying resins of the same general type may be employed in which the resinous copolymer comprises 20–80 weight percent of piperylene and 80–20 weight percent of 2-methyl-2-butene. The resins normally have softening points (ring and ball) between about 80° C. and about 115° C.

Other adhesion promoting resins which are also useful in the compositions of this invention include hydrogenated rosins, esters of rosins, polyterpenes, terpene-phenol resins and polymerized mixed olefins. To obtain good thermo-oxidative and color stability, it is preferred that the tackifying resin be a saturated resin, e.g., a hydrogenated dicyclopentadiene resin such as Escorez® 5000 series resin made by Exxon or a hydrogenated polystyrene or polyalphamethylstyrene resin such as Regalrez® resin made by Hercules.

The amount of adhesion promoting resin employed varies from about 20 to about 400 parts by weight per hundred pans rubber (phr), preferably between about 100 to about 350 phr.

For impact modification, the decoupleable polymer is blended with nylon and polyphenylene ether or a polyolefin. Hydrogenated styrene/isoprene decoupleable copolymers are preferred over hydrogenated styrene/butadiene decoupleable copolymers. In road and roofing compositions, the decoupleable polymer is blended into a bituminous material such as asphalt.

In all of these cases, the advantage of the process of the present invention is achieved when the end use composition is subjected to high temperature conditions over a sustained period of time to decouple enough of the diblocks to achieve the desired properties for the particular end use. Generally, the composition is subjected to a temperature of from 130° C. to 230° C. for a period of from 0.1 to 10 hours. A decoupling accelerator may be added to speed up the time to achieve the desired level of diblock in the composition. This is usually desirable because the high temperatures also lead to undesirable decomposition of the polymer. Decoupling accelerators useful herein include zinc dibutyldithiocarbamate and basic amines such as tribenzylamine. Zinc dibutyldithiocarbamate is especially preferred because it not only promotes decoupling but it also retards the rate of oxidative degradation.

It is preferred for adhesive, coating, and sealant uses that the level of diblock in the end use composition range from 10 to 75% by weight of the total amount of block copolymer present. If it is more than 75%, the cohesive strength will be too low to bear significant loads and if it is less than 10%, the advantage of the decoupleable polymer becomes unnoticeable. For adhesives, the preferred range is 10 to 50% because above 50%, the adhesive will not be able to bear significant loads and below 10%, the aggressive tack will be too poor.

For impact modification compositions, the preferred amount of diblock is from 25 to 100% w. This amount of diblock leads to significant reduction in blend viscosity and in many blend applications allows for the proper rubber morphology to be developed in the matrix.

The rate of decoupling is controlled primarily by the particular coupling agent used and by the presence of decoupling promoter. The amount of decoupling is then controlled by processing time and temperature. Whether or not the copolymer is hydrogenated, the diene chosen also affects the rate of decoupling.

The compositions of the instant invention may contain plasticizers, such as rubber extending plasticizers, or compounding oils or liquid resins. Rubber compounding oils are well-known in the art and include both high saturates content oils and high aromatics content oils. Preferred plasticizers are highly saturated oils, e.g. Tufflo® 6056 oil made by Arco. The amounts of rubber compounding oil employed in the invention composition can vary from 0 to about 100 phr, and preferably between about 0 to about 60 phr.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the adhesive composition.

Additional stabilizers known in the art may also be incorporated into the adhesive composition. These may be for protection during the life of the disposable article against, for example, oxygen, ozone and ultra-violet radiation. However, these additional stabilizers should be compatible with the essential stabilizers mentioned herein-above and their intended function as taught herein.

The adhesive compositions of the present invention are typically prepared by blending the components at an elevated temperature, preferably between about 130° C. and about 200° C., until a homogeneous blend is obtained, usually less than three (3) hours. Various method of blending are known to the art and any method that produces a homogeneous blend is satisfactory. Impact modified compositions are generally made by mixing the blend components in a continuous extruder (twin screw or single screw) process at a melt temperature of between 220° to 300° C. depending on the matrix polymer. The residence time in this type of process is between 1 and 5 minutes. Bituminous compositions are generally made by blending the components in a mixer at elevated temperature (150° C.–190° C.).

Block copolymers based on polybutadiene, which are commonly used in bituminous compositions, can crosslink upon prolonged storage in an asphaltic medium. This results in very high viscosities and renders the blend unprocessable. This crosslinking actually begins with a scission (degradation) of the polymer into lower molecular weight fragments which are "active" and can react with unfragmented material. If the triblock polymer is significantly decoupled to a high degree before this degradation can take place to a significant extent, less crosslinking will take place because the diblock is less likely to crosslink than the "active" fragments. Also. decoupled polymers will be more rapidly dispersed in asphalt, and will allow a greater range of compatibility with other asphalts. Finally, these polymers lead to blends with improved adhesion.

Examples

Example I

EF is ethyl formate. DMA is dimethyl adipate. MTMS is methyltrimethoxysilane. MTCS is methyltrichlorosilane.

TABLE I

| | | | | Coupling Site Stability | | | | |
| | | | | Formulation Viscosity at 177° C., Pas | | Coupling Efficiency, % | | |
| Polymer No. | Type | Coupling Agent | Formulation | 1 hour | 6 hours | 0 hours | 6 hours | Comments |
|---|---|---|---|---|---|---|---|---|
| 1 | SIS | DBE | a) | 1010 | 990 | 78 | 75 | |
| 2 | SIS | 1,2-Dibromocyclohexane | a) | 78 | 76 | 69 | 66 | |
| 3 | SIS | DBB | a) | 135 | 143 | 77 | 71 | |
| 4 | SIS | MTMS | a) | 146 | 105 | 74 | 58 | Uncoupled |
| 5 | SIS | MTCS | a) | 37 | 27 | 73 | 12 | Uncoupled |
| 6 | SIS | MTMS | b) | 520 | 480 | 77 | 71 | |
| 7 | SIS | MTMS | b) + stearic acid | 370 | 390 | 77 | 69 | |
| 8 | SIS | MTMS | b) + tribenzylamine | 350 | 290 | 62$^{d)}$ | 40 | Uncoupled |
| 9 | SBS | DBE | c) | 81 | 68 | 83 | 84 | |
| 10 | SBS | DBB | c) | 72 | 77 | 82 | 80 | |
| 11 | SBS | 2,3-Dibromobutane | c) | 49 | 55 | 83 | 83 | |
| 12 | SBS | MTMS | c) | 46 | 17 | 85 | 36 | Uncoupled |
| 13 | SBS | MTCS | c) | 50 | 19 | 88 | 41 | Uncoupled |
| 14 | SBS | MTMS | c) | 26 | 6.7 | 90 | 16 | Uncoupled |
| 15 | SBS | MTMS | c) | 116 | 56 | 86 | 32 | Uncoupled |
| 16 | SIS | MBZ | a) | 535 | 226 | 81 | 10 | Uncoupled |
| 17 | SIS | EF | a) | 730 | 240 | 79 | 26 | Uncoupled |
| 18 | SIS | MBZ | b) | 585 | 420 | 81 | 39 | Uncoupled |
| 19 | SBS | DMA | c) | — | — | 86 | 66 | Uncoupled |

$^{a)}$100 parts polymer, 100 phr tackifying resin (WINGTACK 95), 2.0 phr zinc dibutyldithiocarbamate (BUTYL ZIMATE)
$^{b)}$100 parts polymer, 100 phr tackifying resin (WINGTACK 95), 1.0 phr antioxidant (IRGANOX 1010)
$^{c)}$100 parts polymer, 100 phr tackifying resin (FORAL 85), 2.0 phr zinc dibutyldithiocarbamate (BUTYL ZIMATE)
$^{d)}$This polymer uncoupled somewhat during sample preparation and before heat aging.

FIG. 1 shows the coupling efficiency as a function of aging time at 177° C. for a hot melt adhesive containing a methyl benzoate coupled SIS polymer, both with (Polymer B) and without (Polymer C) the inclusion of the decoupling accelerator, zinc dibutyldithiocarbamate. Also shown on the graph are the aging results for a commercial SIS block copolymer coupled with a stable coupling agent (Polymer A) and containing 1.0% by weight of zinc dibutyldithiocarbamate. The graph shows that the commercial polymer is quite stable, the methylbenzoate coupled polymer reaches low levels of coupling efficiency quite rapidly and the inclusion of the decoupling accelerator increases the speed and effectiveness of the decoupling process.

Example II

This test simulates a typical time/temperature treatment a hot melt adhesive would receive during mixing and coating. The test polymer is mixed in toluene with 100 phr (parts per hundred rubber-the rubber is the polymer) of a tackifying resin and 2.0 phr of zinc dibutyldithiocarbamate (ZBDC), the decoupling accelerator or 1 phr of antioxidant. The toluene is removed from the adhesive by evaporation for several days in a vacuum oven at 40° C. to simulate preparation of a hot melt adhesive. The dried adhesive is then held at 177° C. in a Brookfield RVTD Viscometer with a number 29 spindle rotating continuously for 6 hours during which time a viscosity reading is taken every hour. Changes in the polymer structure due to degradation and decoupling are determined by gel permeation chromatography analysis on the adhesive scraped from the viscometer cell at the end of the 6 hour aging period.

The results are shown in Table I below. The polymer types used were SIS (styrene-isoprene-styrene) and SBS (styrene-butadiene-styrene). DBE is 1,2-dibromoethane. DBB is 1,2-dibromobutane. MBZ is methyl benzoate.

All of the dibromohydrocarbon coupling agents were stable and the polymers maintained their coupling efficiency. Only the coupling agents within the scope of the present invention uncoupled during the test. See polymer numbers 4, 5, 8, and 12 through 19.

Example III

In this example, three different radial coupled polymers were evaluated. These polymers have the general formula $(S-EP)_x$ indicating that they are hydrogenated styrene-isoprene polymers. One of the polymers, PP3328, also contains a block of EB or hydrogenated butadiene in the coupled polymer arm. The data in the table below were obtained by mixing the neat polymers in a small internal mixing head for various times at various temperatures as shown below. The mixer blade speed was 50 rpm. These conditions were chosen to mimic blending with polyphenylene ether as would be done in making a compound of this type of block copolymer and the polyphenylene ether polymer.

KRATON® G1721 rubber contains SEP arms coupled with dimethyl adipate (DMA). PP3328 is an SEP-EB polymer coupled with methyl benzoate which is almost entirely a linear coupled product. PP3254 is art SEP polymer coupled with methyl benzoate.

TABLE II

| Thermal Decoupling of Various $(S-EP)_x$ Block Copolymers | | | | |
|---|---|---|---|---|
| Temp, °C. | Time, min. | Coupled Polymer, wt % | Decoupled Polymer, wt % | LMW |
| KG-1721 (S-EP)DMA | | | | |
| N/A | 0 | 77.72 | 16.86 | 5.42 |
| 280 | 10 | 51.54 | 32.03 | 16.42 |
| 300 | 5 | 48.18 | 37.97 | 13.86 |
| 300 | 10 | 41.11 | 37.88 | 21.01 |
| PP#3328(S-EP-EB)MBz | | | | |
| N/A | 0 | 87.82 | 12.18 | |
| 280 | 10 | 74.06 | 25.94 | |

TABLE II-continued

Thermal Decoupling of Various (S-EP)$_x$ Block Copolymers

| Temp, °C. | Time, min. | Coupled Polymer, wt % | Decoupled Polymer, wt % | LMW |
|---|---|---|---|---|
| 300 | 5 | 78.03 | 21.97 | |
| 300 | 10 | 69.26 | 30.47 | |
| PP#3254(S-EP)MBz | | | | |
| N/A | 0 | 90.44 | 9.56 | |
| 280 | 10 | 68.55 | 31.45 | |
| 300 | 5 | 70.11 | 29.89 | |
| 300 | 10 | 67.45 | 32.55 | |

The table above shows the relative amounts of coupled and uncoupled polymer left after the test in weight percent. In the case of KG-1721 polymer, a fairly significant amount of low molecular weight (probably degraded) polymer is also present. In all three cases, the amount of uncoupled polymer arms dramatically increases, i.e. by a factor of at least two. This shows that the process described herein does decouple radial polymers as well as linear polymers.

We claim:

1. A process for producing low coupling efficiency block copolymer compositions which comprises
    (a) anionically polymerizing at least one vinyl aromatic hydrocarbon and at least one conjugated diene to form a living block copolymer.
    (b) coupling the block copolymer with a coupling agent selected from the group consisting of esters of carboxylic acids and asymmetric silanes to create a coupled polymer, and
    (c) heating the composition to a temperature of at least 130° C. for a time sufficient to decouple the coupled copolymer such that the amount of uncoupled copolymer in the composition ranges from 10 to 100% by weight of the total amount of block copolymer.

2. The process of claim 1 wherein the amount of uncoupled copolymer ranges from 10 to 75%.

3. The process of claim 2 wherein the time ranges from 0.1 to 10 hours.

4. The process of claim 2 wherein the coupling agent is methyl benzoate.

5. The process of claim 2 wherein the amount of uncoupled copolymer ranges from 10 to 50%.

6. The process of claim 1 wherein the amount of uncoupled polymer ranges from 25 to 100%.

7. The process of claim 6 wherein the time ranges from 1 to 5 minutes.

8. The process of claim 1 wherein the coupling agent is methyl benzoate.

9. An adhesive composition comprising the product of the process of claim 2 and a tackifying resin.

* * * * *